United States Patent
Chiu et al.

(10) Patent No.: US 7,096,342 B2
(45) Date of Patent: Aug. 22, 2006

(54) FLEXIBLE LUN/LBA INTERFACE FOR CONTENT ADDRESSABLE REFERENCE STORAGE

(75) Inventors: Lawrence Yiumchee Chiu, Cupertino, CA (US); Prasenjit Sarkar, San Jose, CA (US); Surugucchi Krishnakumar Rao, Fremont, CA (US); Kaladhar Vorunganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/605,796

(22) Filed: Oct. 28, 2003

(65) Prior Publication Data

US 2005/0091469 A1 Apr. 28, 2005

(51) Int. Cl.
*G06F 12/10* (2006.01)

(52) U.S. Cl. .................... 711/216; 711/6; 711/112; 711/202; 711/203; 711/206; 711/220; 707/203; 710/3; 710/5

(58) Field of Classification Search ............... None
See application file for complete search history.

(56) References Cited

U.S. PATENT DOCUMENTS

| 4,064,494 A | 12/1977 | Dickson et al. ............ 365/49 |
| 6,292,880 B1 | 9/2001 | Mattis et al. ............ 711/216 |
| 6,516,320 B1 * | 2/2003 | Odom et al. ............ 707/101 |
| 2001/0042058 A1 * | 11/2001 | Harrington et al. ............ 707/1 |
| 2003/0001900 A1 | 1/2003 | Cabanes et al. ............ 345/810 |

FOREIGN PATENT DOCUMENTS

| GB | 2374718 | * 10/2002 |
| JP | 2000-285013 | 10/2000 |

OTHER PUBLICATIONS

Douglas Wiebe, "A Distributed Repository for Immutable Persistent Objects," *OOPSLA '86 Proceedings*, Sep. 1986, pp. 453-465.

* cited by examiner

*Primary Examiner*—Mano Padmanabhan
*Assistant Examiner*—Patrick M. Moore
(74) *Attorney, Agent, or Firm*—Lacasse & Associates, LLC; Randy W. Lacasse; Ramraj Soundararajan

(57) ABSTRACT

An LUN/LBA interface is utilized to obtain the benefits of a content addressed storage (CAS) interface. Reference data is manipulated in a manner similar to a CAS system, where an object ID (OID) table is used to maintain OIDs generated for hashed LBAs. A first tier logic block is used to provide a LUN/LBA storage interface to application programs and to facilitate the writing of reference data. A second tier logic block hashes the content of reference data to be written and stores the OID generated to the first OID table. A third tier logic block facilitates writing the reference data to an LUN and to verify the accuracy of reference data to be read from the LUN. Reference data may be written to a storage area in accordance with a write-once, write-many, or write-many with versioning policy.

20 Claims, 7 Drawing Sheets

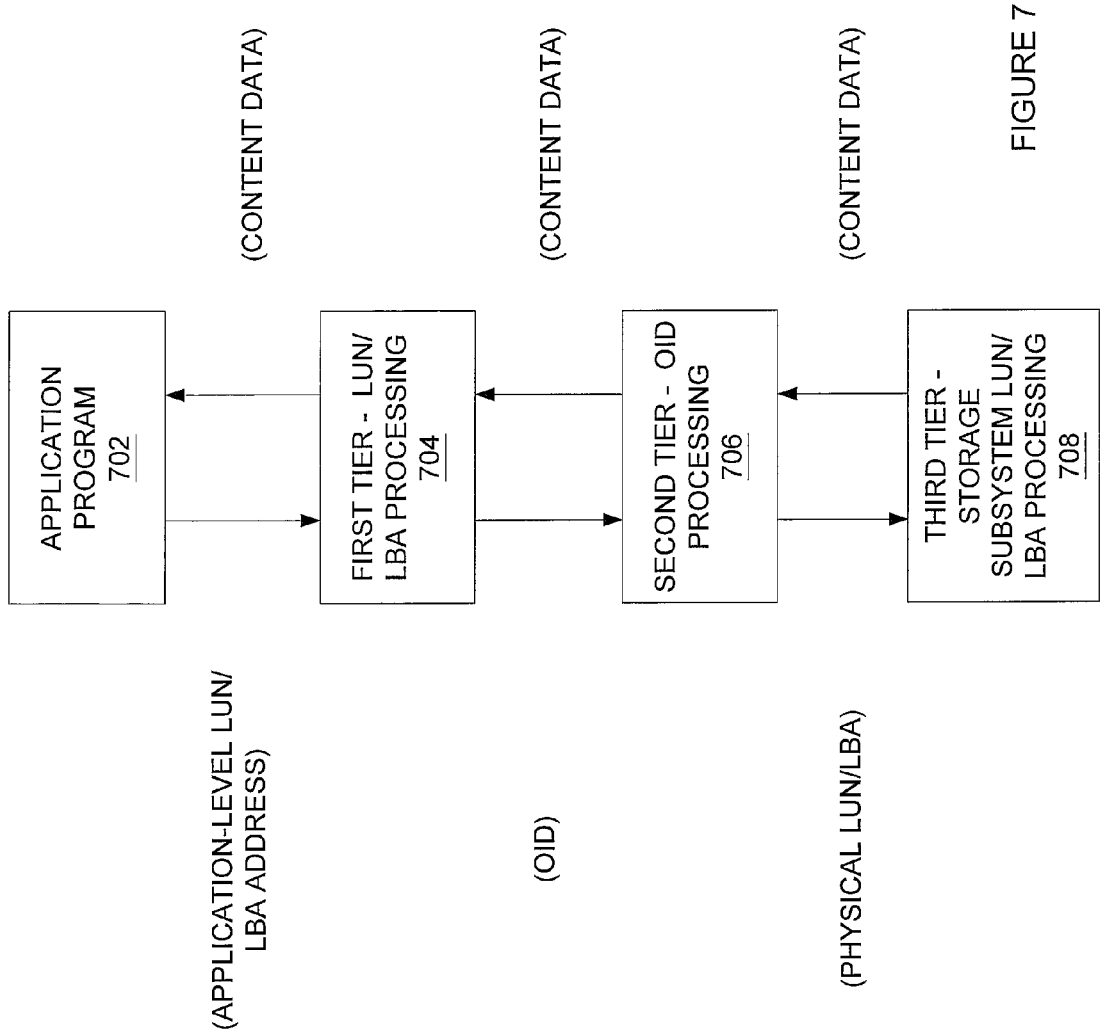

FLEXIBLE LUN/LBA INTERFACE FOR CONTENT ADDRESSABLE REFERENCE STORAGE

BACKGROUND OF INVENTION

1. Field of the Invention

The present invention reelates generally to the field of content addressed storage. More specifically, the present invention is related to a logical block addressing (LBA) and logical unit number (LUN) interface for the manipulation of reference data.

2. Discussion of Prior Art

The benefits of content addressed storage (CAS) have long since been known and have been used to store, access, and protect reference data. CAS has been devised to manipulate this class of data known as reference data. Reference data refers to data that is written once and infrequently retrieved. Examples of data that fall in this class include x-rays, photos and videos, land titles, and financial documents. Reference data differs from transactional data in that reference data is not updated or retrieved with any sort of regular frequency. CAS relies on a scheme that hashes input reference data content to generate a unique object identifier.

With CAS, the write-once property is easily enforced if an object is modified, then it is stored as a new object because input reference data content will hash to another unique object identifier. Duplicates are also easily detectable since a user inputting reference data content identical to content already stored on the system will receive an identical object identifier. If an identical object identifier is received, then a duplicate object will not be created. CAS also allows the verification of the content of stored objects during retrieval. When an object is retrieved, its content is rehashed and checked against a previous hash, generated when the object was initially stored. CAS also has a larger address space than an LUN/LBA interface.

Logical block addressing (LBA) is a method used to translate cylinder, head, and sector information of a disk drive into addresses that can be used by an operating system during boot-up. Logical unit number (LUN) refers to a unique number given to each peripheral device connected to a common bus. Commands sent to a particular type of bus (e.g., SCSI) distinguish devices on the basis of their LUNs.

The CAS interface was initially proposed by Quinlan et al in "Venti: A new Approach to Archival Storage" paper. Although CAS provides many benefits, a CAS interface also requires overlaying applications to be re-written using CAS API or using an OID interface, both of which mandate a change in the implementation of existing applications. This is in opposition to the more traditionally used LUN/LBA interface.

US 2003/0001900 A1 discloses a method for executing one or more operations in a computer for interfacing an associated user with a knowledge portal that is operatively associated with a plurality of data objects in a data store. Cabanes et al. also discloses a user interface method that includes the steps of receiving user input; updating, based on received user input, one of a current object identity, a preview object identity, and a knowledge map parameter which is updated based on a current object identity. Storing user input requires placement of a document into context with respect to other information stored and available on an electronic information system. This method is useful in the context of searching and content classification. There is limited or no provision in this reference for content addressing or hashing and write properties including write-once, write-many, and write-many with versioning.

U.S. Pat. No. 6,292,880 discloses a method for caching information objects where information objects are stored according to the hash of an object's filename and its content. The disclosed method provides for an object store that supports multiple different versions of targeted alternates for the same name and storage of objects without content duplication. However, explicit mention of a method to write object content to a storage area, and re-write different object content in that same storage area is not made. Mattis et al. requires additional mappings from name keys to vectors of alternates as well as from content keys to object content data.

U.S. Pat. No. 4,064,494 discloses a content addressable memory that can non-destructively be read and which is adapted to respectively store true and inverse information data. While this reference provides electronic architectures supporting information storage and comparison, there is no premise for interfacing overlying applications with the electronic hardware existing on a lower level. In addition, no mention is made of a unique identifier for each piece of information data. There is also no premise for upholding a write-many with versioning property.

JP 2000285013 discloses an interface between a CPU and an SDRAM capable of quickly reading out data from the SDRAM by control similar to that of a DRAM. The disclosed device, however, fails to provide for a means of content addressing or hashing and write properties including write-once, write-many, and write-many with versioning in the English translation of the abstract.

"A Distributed Repository for Immutable Persistent Objects" by Douglas Wiebe discloses a system for manipulating system model objects that provides for transactional, write-once storage. System model objects describe the structure and versions of software and are located using an expanding ring multicast search algorithm. This reference provides for a system and software that addresses stored data by structure rather than solely content.

Whatever the precise merits, features and advantages of the above cited references, none of them achieve or fulfills the purposes of the present invention. There exists a need to provide the benefits of CAS with a write-once, a write-many, and a write-many property in a single system and method. It is also advantageous that a system and method provide a LUN/LBA to interface with existing content addressable memory systems.

SUMMARY OF INVENTION

The present invention is a system and method for content addressable storage with an LUN/LBA interface. Reference data is manipulated in a manner similar to a CAS system, where an object ID (OID) table is used to maintain OIDs generated for hashed LBAs.

The system of the present invention is comprised of three tiers. A first tier logic block is used to provide an LUN/LBA storage interface to application programs and to facilitate the writing and retrieval of reference data. A second tier logic block hashes reference data content to be written and stores a generated OID in a high-level OID table. A third tier logic block facilitates the writing of reference data to an LUN and the verification of the accuracy of reference data retrieved from a LUN. A second low-level OID table facilitates this process.

Access to an LUN/LBA storage area may be governed by the following properties; a write-once property wherein the modification of an object results in the storage of a new object because content hashes will no longer match; a write-many property wherein multiple updates on a particular LUN/LBA are allowed; and lastly, a write-many with versioning property may be allowed wherein separate versions of a single object are chained together in an OID table.

Verification of the content of reference data occurs at the time of their retrieval. When an object is retrieved, its content is re-hashed and checked against a previously generated hash when the object was initially stored.

An LUN/LBA interface is utilized to obtain the benefits of the CAS interface without the necessity of re-writing an application interacting with an LUN/LBA so that it can communicate with a CAS API.

BRIEF DESCRIPTION OF DRAWINGS

FIG. 7 is a data flow diagram for retrieving content data.

DESCRIPTION OF THE PREFERRED EMBODIMENTS

Figure 1:
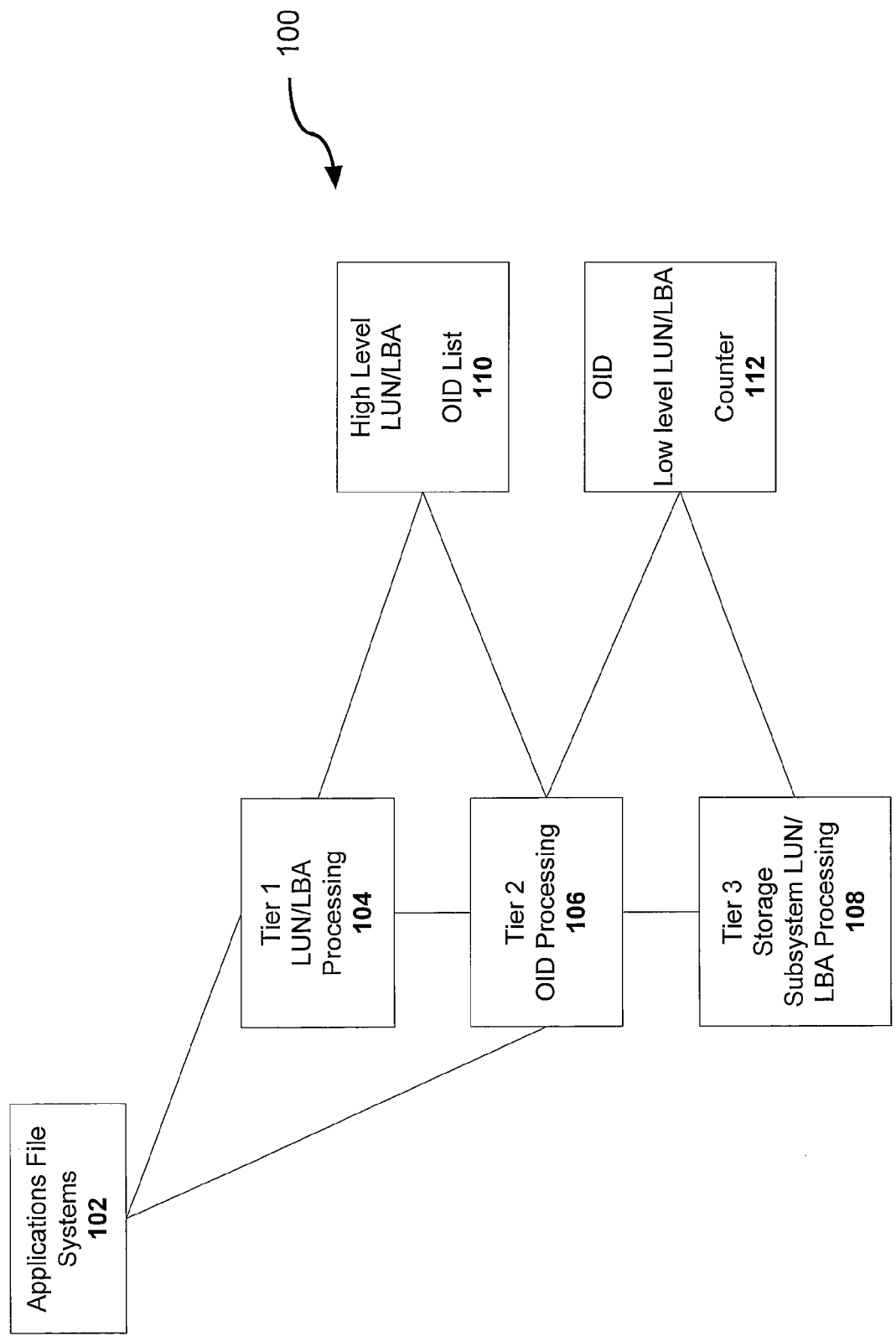
FIG. 1 illustrates a multi-tiered infrastructure of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

An LUN/LBA interface is utilized to obtain the benefits of a content addressed storage (CAS) interface. Reference data is manipulated in a manner similar to a CAS system, where an object ID (OID) table is used to maintain OIDs generated for hashed LBAs.

A first tier logic block is used to provide an LUN/LBA storage interface to application programs and to facilitate the writing of reference data. A second tier logic block hashes reference data to be written and stores an OID generated in a high-level table and a low-level table. A first table provides a mapping between a high-level LUN/LBA combination and an associated OID or OID list. A second table provides a mapping between a low-level LUN/LBA combination and an associated OID or OID list and also provides a counter for each OID. A third tier logic block facilitates writing content reference data to an LBA and verifies of the accuracy of reference data retrieved from an LUN. Reference data is written to a storage area in accordance with a write-once, write-many, or write-many with versioning property.

Referring now to FIG. 1, three-tiered infrastructure 100 is shown. Three-tiered infrastructure 100 comprises a first tier for LUN/LBA processing 104, a second tier for OID processing 106, a third tier for storage subsystem LUN/LBA processing 108, a high-level OID table 110, and a low-level OID table 112.

Figure 2:
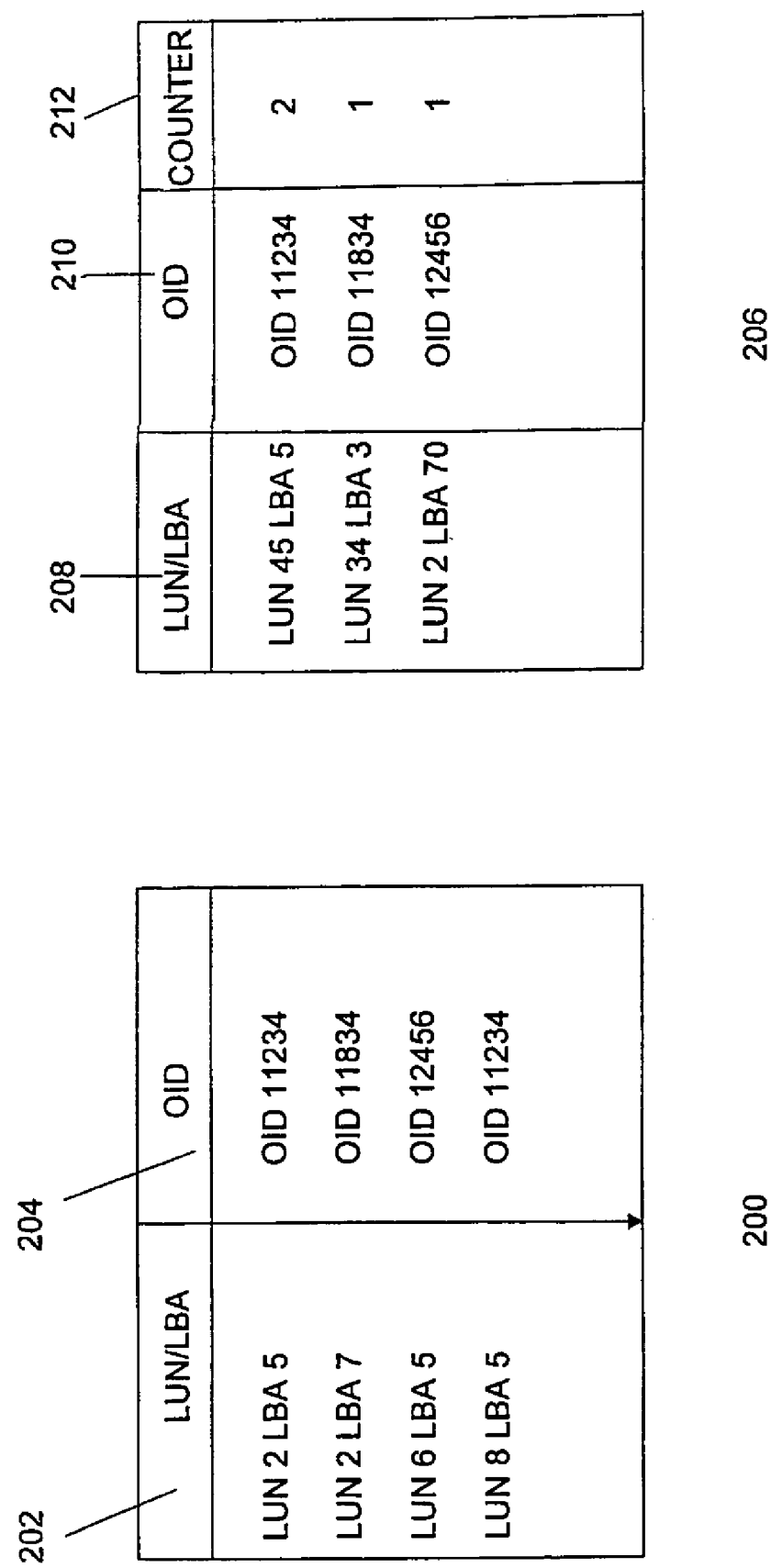
FIG. 2 illustrates a high-level and a low-level OID table.

In FIG. 2, two exemplary data structures of the present invention are shown. High-level OID table 200 contains two columns, a first column for an application-level LUN/LBA combination 202 and a second column for an associated OID or OIDs 204, the number of OIDs being dependant on a chosen access property. Low-level OID table 206 contains three columns, a first column for physical LUN/LBA value 208, a second column for an associated OID or OIDs 210, and a third column for a counter 212 that is incremented every time a different application program writes data that hashes to a particular OID value. Counter 212 ensures that an OID can only be deleted when all applications have stopped writing to a particular object. Note that physical LUN/LBA combination 208 differs from application-level LUN/LBA combination 202 as it is an actual location of where reference data is stored in a storage sub-system, whereas application-level LUN/LBA combination 202 is a virtual location determined by application program data received at an interface. An application-level LUN/LBA combination 202 is location independent it allows an application or users of an application to group data. Mapping between an application-level LUN/LBA combination 202 and OID is set after content data has been hashed and an OID has been generated. Then, in high-level OID table 200, for a particular LUN/LBA combination 202, a generated OID value is stored. In a low-level OID table 206, an OID is written first. Once content data is written to a physical LUN/LBA combination, the value of a physical-level LUN/LBA combination to which content data was written is stored in low-level OID table 206. Thus, mapping between a physical LUN/LBA combination to which content data was written and an OID corresponding to a hash of the written content data is established.

Figure 3:
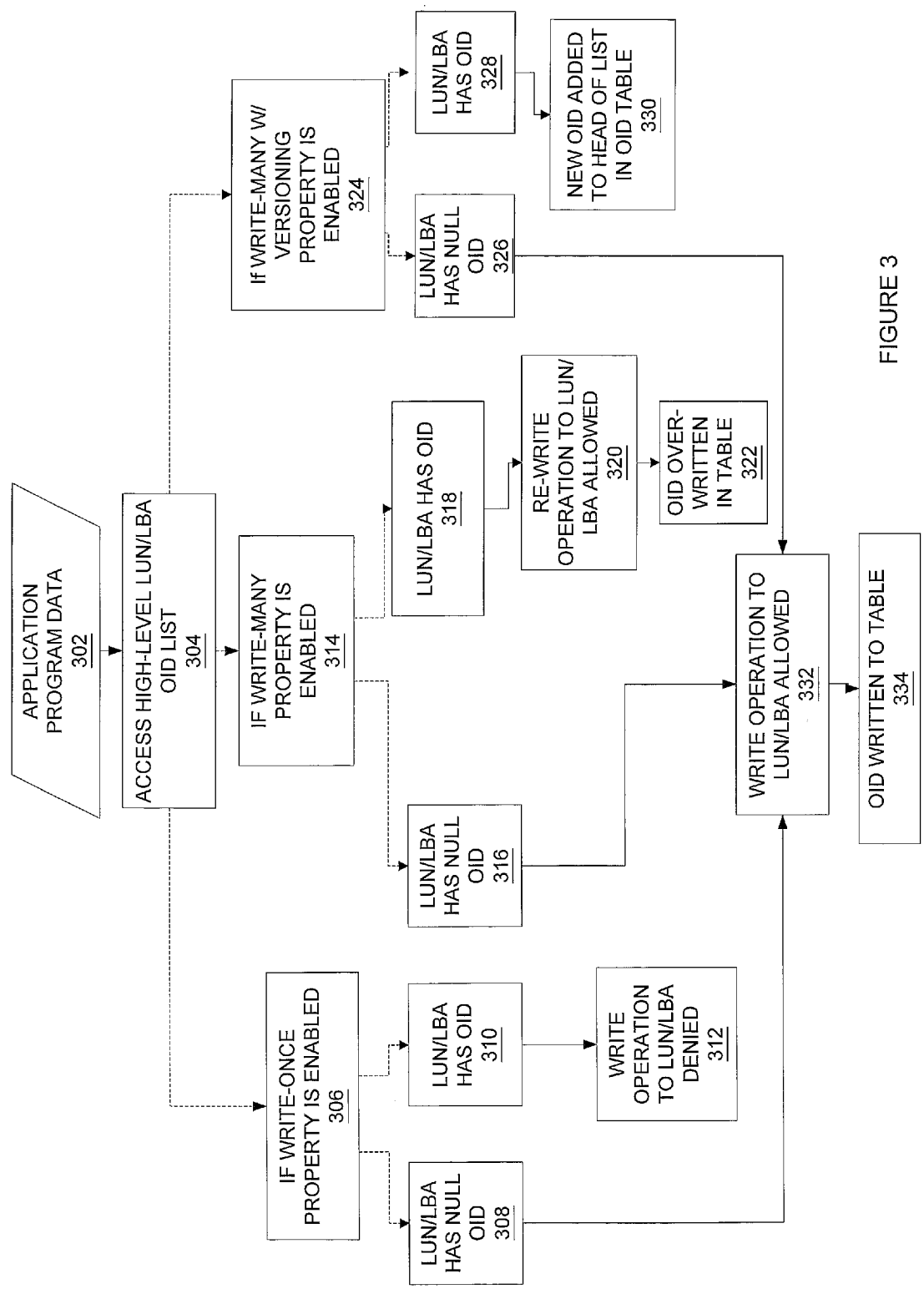
FIG. 3 is a process flow diagram of first tier processing.

Referring now to FIG. 3, a first tier logic block is shown. First tier processing involves interaction with application programs and provides an LUN/LBA storage interface. In this first tier LUN/LBA processing block, an application program data 302 provides reference data to be hashed, and for which an OID is generated. A comparison is made between a reference data OID value and OIDs stored in a high-level OID table 304. From the comparison, a determination is made as to whether reference data for which an OID has been generated, has been previously written. The present invention allows for three different types of LUN/LBA access. The access type may be configured by a user (e.g. system administrator) and is determined subsequent to a previously mentioned determination step.

If a write-once property is enabled 306, high-level OID table 200 is consulted to determine whether a particular LUN/LBA 202 is associated with an OID 204. If LUN/LBA 202 has been written to in the past, then LUN/LBA 202 will have a corresponding OID 204 in an OID column; otherwise, it will contain a default null value. If LUN/LBA has a null OID 308, write operation is to LUN/LBA 332 is allowed. Subsequent to write operation to LUN/LBA 332, an OID is written to high-level table 334. If LUN/LBA has an OID 310, then application program data 302 is denied a write operation to LUN/LBA 312. A write-once property is enforced as a result of recognizing that if an object is modified, then it is stored as a new object because its content hash will be different. If a user has stored an object A in a system and another user tries to store an object B having content identical to object A, a match will be detected as the content hashes of objects A and B will be the same. Thus, a new object B is not created when a write-once access property is enforced.

If a write-many property is enabled 314, high-level OID table 200 is consulted to determine whether a particular LUN/LBA 202 is associated with an OID 204. If LUN/LBA has a null OID 316, write operation is to LUN/LBA 332 is allowed. Subsequent to write operation to LUN/LBA 332, OID is written to high-level table 334. If LUN/LBA has an OID 318, then application program data 302 is allowed a re-write operation to LUN/LBA 320 and a previous OID is over-written in a high-level OID table 322.

If a write-many with versioning property is enabled 324, high-level OID table 200 is consulted to determine whether a particular LUN/LBA 202 is associated with an OID 204. If LUN/LBA has a null OID 326, write operation is to LUN/LBA 332 is allowed. Subsequent to write operation to LUN/LBA 332, OID is written to high-level table 334. If LUN/LBA has an OID 328, then application program data 302 is allowed a write operation to LUN/LBA and an OID associated with application program data 302 is added to the head of a list in an OID table 330. A previous OID moves toward the tail of the list. If a newly generated OID already exists within an OID list, then a counter for that OID is incremented to prevent its accidental deletion. When content data associated with a particular OID is deleted by an application, if an associated counter value is not zero, then that particular content data is not deleted from its physical storage location because another application could be using that content data.

A user may also control the granularity of the access type chosen granularity occurs at levels including an entire system, an aggregation of LUN/LBAs, and a single LUN/LBA. Applications determine what elements to aggregate and the level of aggregation.

Figure 4:
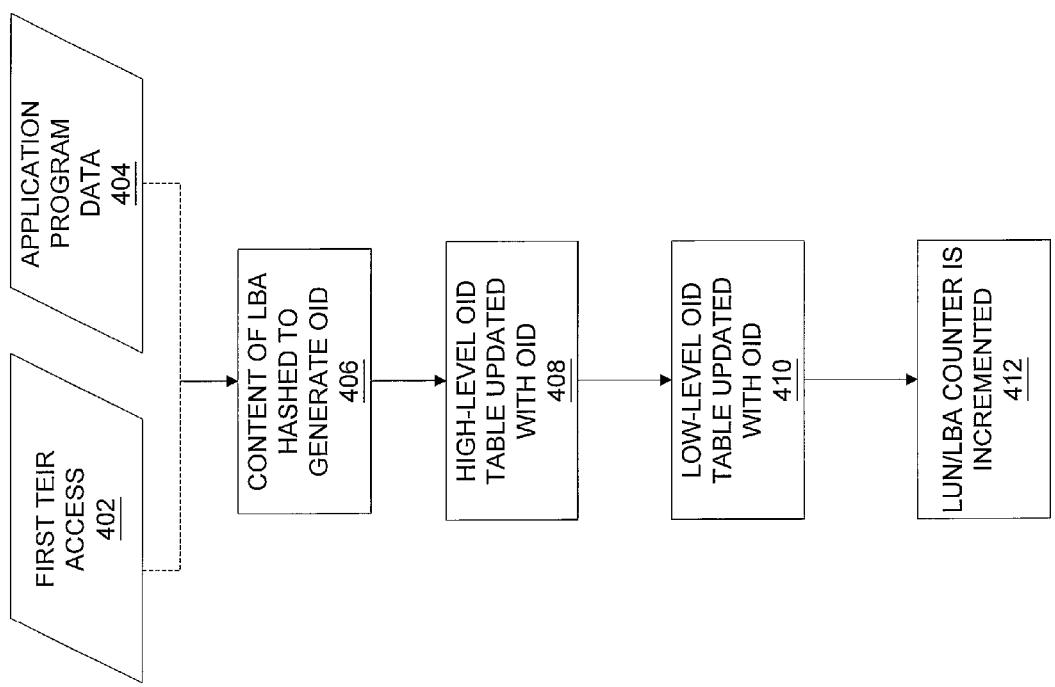
FIG. 4 is a process flow diagram of second tier processing.

Referring now to FIG. 4, a second tier logic block is shown. Second tier OID processing receives content reference data from a first tier interface 402 or directly from an application 404. Thus, an application can directly opt to use the OID interface of the second tier instead of accessing data via the LUN/LBA interface of the first tier of FIG. 3. In second tier OID processing, content reference data to be written is hashed and an OID is generated 406. Next, a high-level OID table is updated 408 with newly generated hash value for an associated LUN/LBA 202. Low-level OID table is further updated 410 with newly generated hash value. Second tier OID processing helps to eliminate duplicates—if two separate LUN/LBA combinations have the same data content, then content associated with both combinations will hash to the same OID. LUN/LBA counter is incremented 412.

Figure 5:
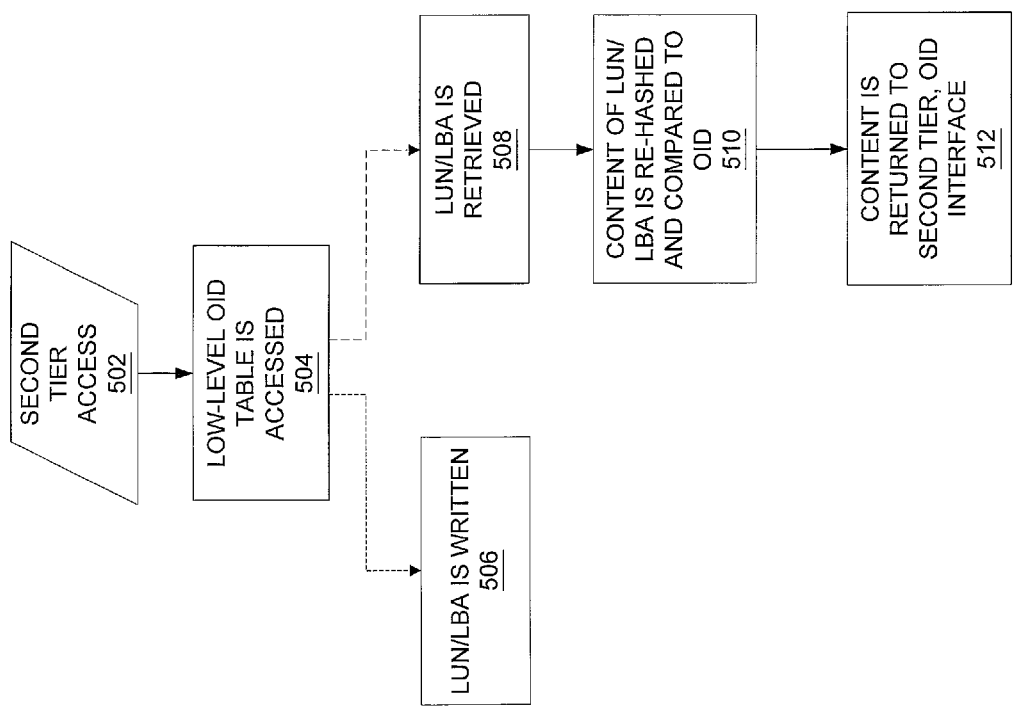
FIG. 5 is a process flow diagram of third tier processing.

Referring now to FIG. 5, a third tier logic block is shown. Third tier OID processing receives data from second tier interface 502. Low-level OID table is accessed 504 to write to an LUN/LBA 506 data received from second tier interface 502. If data from a particular LUN/LBA combination is to be retrieved 508, reference data it is re-hashed and the hash value generated is compared against an OID value 510 generated during the original writing of data in the second tier logic block of FIG. 4. In this tier, data is simply written or retrieved from a lower level LUN/LBA of a storage subsystem. Thus, third tier OID processing helps to verify the accuracy of lower level LBA content that has been retrieved 508 from a storage subsystem.

Figure 6:
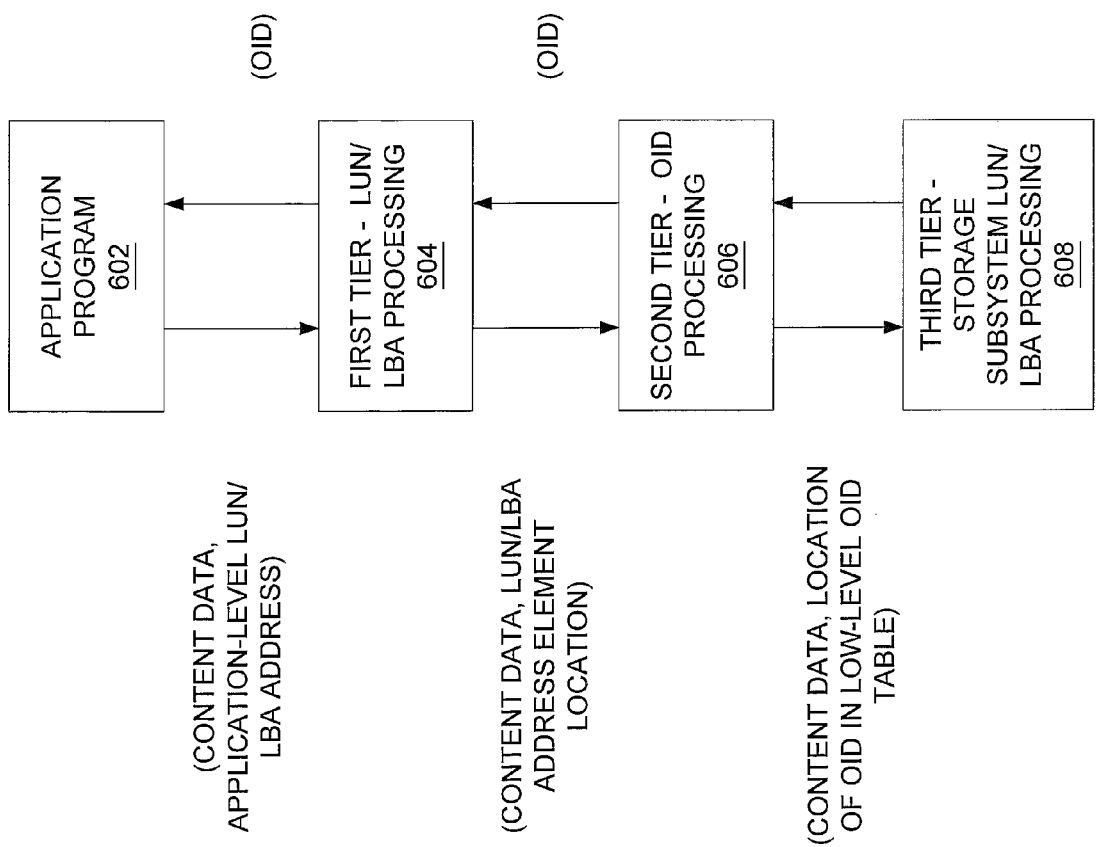
FIG. 6 is a data flow diagram for writing content data.

Shown in FIG. 6 is a data flow diagram for writing content data. Content data and an LUN/LBA address combination are provided as data from application program 602 to first LUN/LBA processing tier 604. First LUN/LBA processing tier 604 creates, if necessary, an entry in a high-level OID table for an LUN/LBA address combination provided as data from application program 602. Data passed between first LUN/LBA processing tier 604 and second OID processing tier 606 comprises content data and an LUN/LBA element location address from a high-level OID table. Second OID processing tier 606 hashes content data received from first LUN/LBA processing tier 604 and generates an OID. Second OID processing tier 606 fills in generated OID value in a high-level OID table at an LUN/LBA element location address also received from first LUN/LBA processing tier 604. Content data, an OID, and a location of the OID in a low-level OID table are passed to a third storage subsystem LUN/LBA processing tier 608. After writing content data to a physical LUN/LBA combination, third storage subsystem LUN/LBA processing tier 608 fills in a physical LUN/LBA combination in a low-level OID table in an entry corresponding to OID of written content data.

Shown in FIG. 7 is a data flow diagram for retrieving content data. Application program data 702 provides a LUN/LBA address combination from which to retrieve content data. At first LUN/LBA processing tier 704, a high-level OID table is consulted to determine an OID corresponding to an LUN/LBA combination received from application program data 702. First LUN/LBA processing tier 704 passes an OID to second OID processing tier 706. At second OID processing tier 706, a low-level OID table is consulted to determine a physical LUN/LBA combination corresponding to an OID received from first LUN/LBA processing tier 704. A physical LUN/LBA combination is passed to third storage subsystem LUN/LBA processing tier 708 to retrieve content data. Content data is passed from third storage subsystem LUN/LBA processing tier 708 to second OID processing tier 706 to first LUN/LBA processing tier 704 and finally, to application program 702 requesting the retrieval.

The present invention does not preclude another application from simultaneously using the OID type interface to get the benefits of a larger address space of the OID interface. That is, one application may interface at a first LUN/LBA processing tier, whereas another application may interface at a second OID processing tier, thereby bypassing a first LUN/LBA processing tier.

CONCLUSION

A system and method has been shown in the above embodiments for the effective implementation of a flexible LUN/LBA interface for content addressable reference storage. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by application software/program or specific computing hardware or peripheral device.

All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of object-oriented programming.

The invention claimed is:

1. A method for facilitating writing and retrieval in a content addressed storage (CAS) system utilizing a Logical Unit Number/Logical Block Address (LUN/LBA) interface comprising steps of:

a. receiving an input/output (I/O) operation request, associated application-level LUN/LBA combination, and optionally, content data from an application program at a first LUN/LBA processing tier or at a second OID processing tier, b. hashing said content data to generate an OID at said second OID processing tier if content data is received in said receiving step, c. consulting a high-level OID table and an access property with said received application-level LUN/LBA combination or said generated OID to determine whether said content data can be retrieved from or written to an LUN/LBA combination, respectively, and based on said consulting step, performing at a third storage subsystem LUN/LBA processing tier actions comprising: a write, over-write, or addition operation to an LUN/LBA combination, a retrieval from an LUN/LBA combination, and a denial of operation.

2. A method for facilitating writing and retrieval, as per claim 1, wherein said high-level OID table and a low-level OID table are updated if said content data is written to an LUN/LBA combination.

3. A method for facilitating writing and retrieval, as per claim 1, wherein said consulting step occurs at said first LUN/LBA processing tier, if said receiving step occurs at said first LUN/LBA processing tier, and at said second OID processing tier, if said receiving step occurs at said second OID processing tier.

4. A method for facilitating writing and retrieval, as per claim 1, wherein said high-level OID table is comprised of at least: an LUN/LBA combination, and an associated OID or plurality of OIDs.

5. A method for facilitating writing and retrieval, as per claim 1, wherein said low-level OID table is comprised of at least: an LUN/LBA combination, an associated OID or plurality of OIDs, and a counter associated with each OID.

6. A method for facilitating writing and retrieval, as per claim 1, wherein said access property is one of a: write-once, write-many, or write-many with versioning property.

7. A method for facilitating writing and retrieval, as per claim 6, wherein said write-once property allows a write operation, if an LUN/LBA combination contained in a high-level table has an associated OID with a null value, and a denial of operation otherwise.

8. A method for facilitating writing and retrieval, as per claim 6, wherein said write-many property allows operations comprising: a write operation, if an LUN/LBA combination contained in a high-level table has an associated OID with a null value, and a re-write operation, if an LUN/LBA combination contained in a high-level table has an associated OID with a non-null value.

9. A method for facilitating writing and retrieval, as per claim 6, wherein said write-many with versioning property allows operations comprising: a write operation, if an LUN/LBA combination contained in a high-level table has an associated OID with a null value, and an addition operation, if an LUN/LBA combination contained in a high-level table has an associated OID or plurality of OIDs with non-null values.

10. A method for facilitating writing and retrieval, as per claim 1, wherein said write operation comprises steps of writing an OID generated from a hash of said content data to either one of, or both, a high-level OID table and a low-level OID table and writing said content data to an LUN/LBA combination.

11. A method for facilitating writing and retrieval, as per claim 1, wherein said over-write operation comprises steps of updating an existing OID with an OID generated from a hash of said content data associated with an LUN/LBA combination in either one of or both a high-level OID table and a low-level OID table and writing said content data to an LUN/LBA combination.

12. A method for facilitating writing and retrieval, as per claim 1, wherein said addition operation comprises steps of adding to an OID list in either one of or both a high-level OID table and a low-level OID table, an OID generated from a hash of said content data associated with an LUN/LBA combination and writing to an LUN/LBA combination said content data.

13. A first LUN/LBA processing tier in a content addressed storage (CAS) system performing actions comprising:

a. receiving an input/output (I/O) operation request, associated application-level LUN/LBA combination, and optionally, content data from an application program, b. passing said content data to a second OID processing tier if content data is received from said application program, c. using said application-level LUN/LBA combination received from said application program or using an OID returned from second OID processing tier if said content data was passed to said second OID processing tier in previous step to determine whether corresponding or same OID exists in a high-level OID table, d. determining whether a write, over-write, or an addition operation is allowed or if an operation is denied, based on said step of determining whether corresponding or same OID exists in said high-level OID table and said access property, e. passing said operation information and either: an OID if a retrieval operation is requested or an LUN/LBA address combination element location and associated content data for any other operation, and f. updating said high-level OID table with a new OID for an associated application-level LUN/LBA if a write, over-write, or an addition operation is allowed.

14. A second Object ID (OID) processing tier in a content addressed storage (CAS) system performing actions comprising:

a. receiving an application-level LUN/LBA address combination and optionally, content data from either an application program or a first LUN/LBA processing tier, b. receiving a received OID from said first LUN/LBA processing tier if said content data is not received, c. hashing said content data to generate a generated OID if said content data is received, d. determining a physical LUN/LBA by using said received OID to consult a low-level OID table, e. determining whether a generated OID exists in a high-level OID table by comparing said generated OID to stored OIDs stored in said high-level OID table, f. updating said high-level OID table with said generated OID if said generated OID does not exist in said high-level OID table, g. passing a write request, said content data, and a location of OID in said low-level OID table to a third storage subsystem LUN/LBA processing tier if said content data is received in step a, based on step d and operations allowed by an access property, h. updating said low-level OID table with said generated OID and incrementing a counter associated with said generated OID, if said write request and said content data are passed to said third storage subsystem LUN/LBA processing tier, i. passing a retrieval request and a physical LUN/LBA combination to said third storage subsystem LUN/LBA processing tier if said received OID was received in step b, based on step e and operations allowed by said access property, j. passing to said third LUN/LBA processing tier said received OID if said write request and said content data are passed to said third storage subsystem LUN/LBA processing tier, and k. receiving said content data from said third storage subsystem LUN/LBA processing tier, if said retrieval request and said physical LUN/LBA are passed to said third storage subsystem LUN/LBA processing tier.

15. An third storage subsystem LUN/LBA processing tier in a content addressed storage (CAS) system performing actions comprising:

a. receiving from a second OID processing tier a write request or a retrieval request and associated data, b. using an OID received from said second OID processing tier to determine associated LUN/LBA combination, c. writing to an LUN/LBA combination if a write request and associated content data is received, d. retrieving from an LUN/LBA if a retrieval request and an associated OID is received, e. re-hashing content data retrieved from an LUN/LBA combination if a retrieval request and an associated OID is received, f. comparing results of re-hashing step with an OID associated with said LUN/LBA combination stored in a low-level OID table, and g. passing to said second OID processing tier content data if a retrieval request and an associated OID was received.

16. A system for Content Addressed Storage (CAS) having a Logical Unit Number/Logical Block Address (LUN/LBA) interface comprising:

a. a first LUN/LBA processing tier configured to receive at least a high-level LUN/LBA combination and optionally content data from an application, b. a second OID processing tier configured to provide an OID, either by generating said OID from said content data optionally received by said first LUN/LBA processing tier, or by receiving said OID from said application, c. a storage subsystem LUN/LBA processing tier configured to receive said OID provided by said second OID processing tier and to access a low-level LUN/LBA combination, d. a first table providing a correspondence between said high-level LUN/LBA combination and said OID, and e. a second table providing a correspondence between said low-level LUN/LBA combination and said OID.

17. A system for CAS having an LUN/LBA interface, as per claim 16, wherein said second table comprises a counter associated with each said OID.

18. The first LUN/LBA processing tier according to claim 16, further comprising:

a. means for receiving an input/output (I/O) operation request, b. means for using said high-level LUN/LBA combination received from said application program or using said OID from said second OID processing tier if said content data was passed to said second OID processing tier to determine whether said OID exists in said first OID table, c. means for determining whether a write, over-write, or addition operation is allowed, based on whether said OID exists in said first OID table and based on said access property, d. means for passing information on whether said operation is allowed and either: an OID if a retrieval operation is requested or an LUN/LBA address combination element location and associated content data for any other operation, and e. means for updating said first OID table with a new OID for an associated high-level LUN/LBA if a write, over-write, or addition operation is allowed.

19. The second OID processing tier according to claim 16, further comprising:

a. means for receiving said OID from said first LUN/LBA processing tier if said content data is not received, b. means for hashing said content data to generate said OID if said content data is received, c. means for determining whether said OID exists in said first OID table by comparing said OID to stored OIDs stored in said first OID table, d. means for updating said first OID table with said OID if said OID does not exist in said first OID table, e. means for passing a write request, said content data, and a location of OID in said second OID table to said storage subsystem LUN/LBA processing tier, based on operations allowed by an access property, f. means for updating said first OID table with said OID and incrementing a counter associated with said OID, if said write request and said content data are passed to said storage subsystem LUN/LBA processing tier, g. means for passing a retrieval request and said low-level LUN/LBA combination to said storage subsystem LUN/LBA processing tier, based on operations allowed by said access property, h. means for passing to said LUN/LBA processing tier said OID if said write request and said content data are passed to said storage subsystem LUN/LBA processing tier, and i. means for receiving said content data from said storage subsystem LUN/LBA processing tier, if said retrieval request and said low-level LUN/LBA are passed to said storage subsystem LUN/LBA processing tier.

20. The storage subsystem LUN/LBA processing tier according to claim 16, further comprising:

a. means for receiving from said second OID processing tier a write request or a retrieval request and associated data, b. means for using said OID received from said second OID processing tier to determine associated LUN/LBA combination, c. means for writing to said low-level LUN/LBA combination if said write request and associated content data is received, d. means for retrieving from said low-level LUN/LBA if a retrieval request and an associated OID is received, e. means for re-hashing content data retrieved from said low-level LUN/LBA combination if said retrieval request and said associated OID is received, f. means for comparing results of re-hashing step with an OID associated with said LUN/LBA combination stored in said second OID table, and g. means for passing to said second OID processing tier content data if said retrieval request and said associated OID was received.

* * * * *